Oct. 30, 1962    D. W. BARTON ETAL    3,061,036
POWER STEERING SYSTEM
Filed July 23, 1959
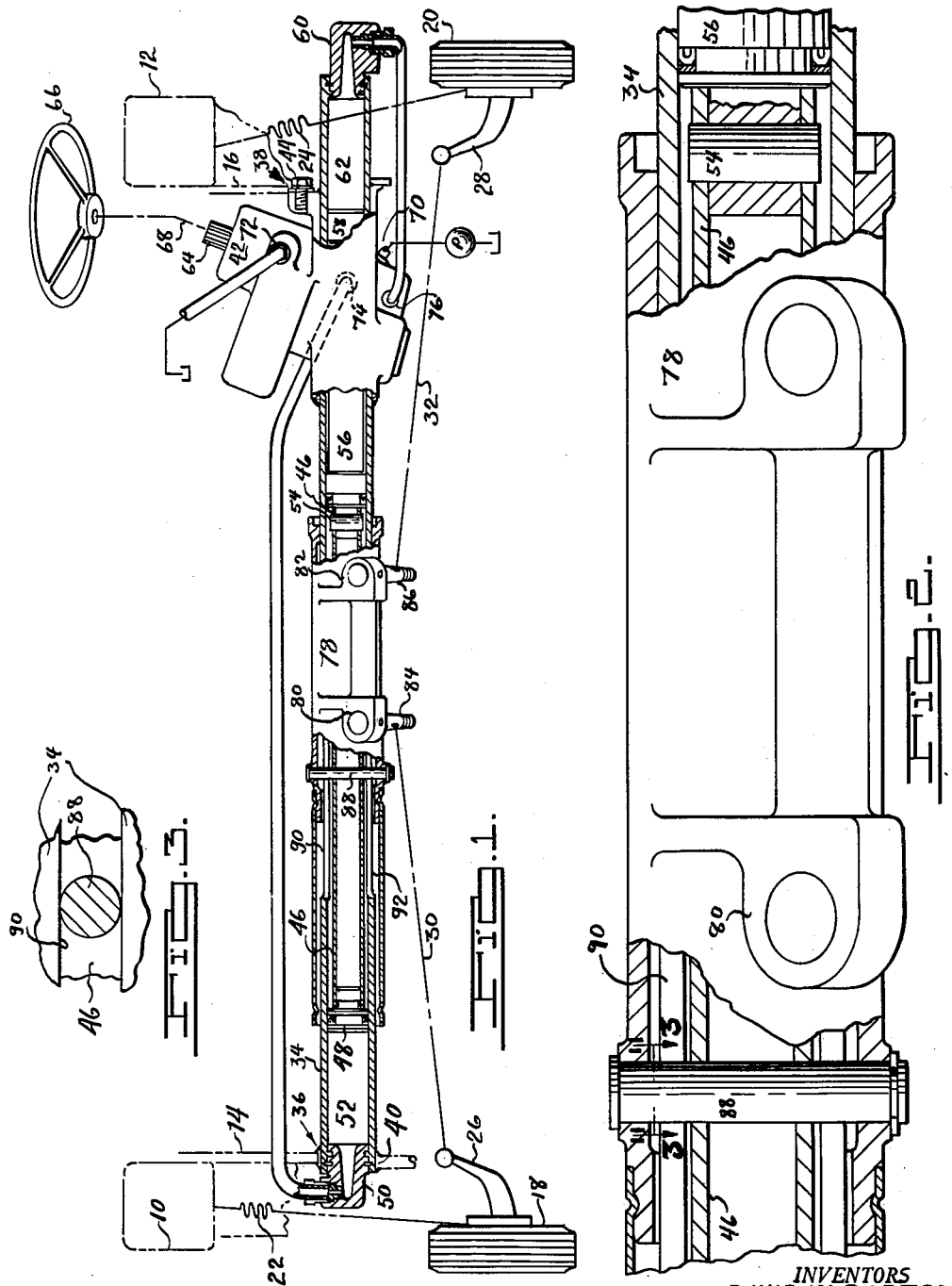
INVENTORS
DAVID W. BARTON
JOHN R. ELWELL
BY
John R. Faulkner
Thomas H. Oster
ATTORNEYS

United States Patent Office 3,061,036
Patented Oct. 30, 1962

3,061,036
POWER STEERING SYSTEM
David W. Barton, Birmingham, and John R. Elwell, Dearborn, Mich., assignors to Ford Motor Company, Dearborn, Mich., a corporation of Delaware
Filed July 23, 1959, Ser. No. 828,999
1 Claim. (Cl. 180—79.2)

This invention relates generally to a power steering system for motor vehicles, and more particularly to an improved power cylinder and mounting therefor for use in such a system.

The usual hydraulic power steering system includes a longitudinally extensible power strut comprising a cylinder and piston assembly having one of its relatively moveable members fixed to the vehicle frame and the other connected to the dirigible wheels of the vehicle. Ordinarily, the working parts of a cylinder and piston assembly are capable not only of relative longitudinal movement, but also relative rotation about the longitudinal axis. In many applications a degree of rotational freedom is of no particular concern in that the thrust is transmitted to and from the piston and cylinder through a ball joint having its center located on the longitudinal axis of the unit, thus imposing little or no rotation producing torque on the members of the assembly.

In some applications it has been found desirable to couple the steering linkage to the power strut at a coupling point which is located eccentrically with respect to the axis of the cylinder and piston. An eccentric mounting such as this produces a torque which, if not counteracted, will cause relative rotation between the cylinder and the piston. This rotation not only interferes with the proper application of steering power, but also permits the wheels to move without proper restraint under the influence of road irregularities.

In the case of an anchored piston and shiftable cylinder, the prior art has treated of the problem of restraining the cylinder against rotation. Patent No. 2,754,924 shows a drag link having universal connections to a pitman arm and to a moveable power cylinder, the drag link being engaged intermediate between the universal connections by a forked torque arm extending radially out from the cylinder to restrain the cylinder against rotation about its axis. Patent No. 2,676,663 to Smith shows a power cylinder having a piston rod flexibly connected to one side rail of the vehicle, the cylinder being moveable and connected to a stud on the pitman arm with two degrees of freedom—one axial, for valve actuation, the other pivotal about an axis perpendicular to the longitudinal axis of the cylinder to accommodate the arcuate pitman travel. Rotation of the cylinder about its longitudinal axis is restrained by the pitman arm and connecting stud. However, these devices are not applicable to the case of an anchored cylinder and shiftable piston.

It is an object of this invention to provide an improved power strut for a motor vehicle power steering system.

It is a further object of this invention to provide such a power strut having improved means for restraining the relatively moveable parts against relative rotation induced by torques resulting from eccentric coupling of the steering linkage to the strut parts.

It is an additional object of this invention to provide such a power strut having an improved mounting which avoids the use of flexible conduits.

Further objects and advantages of the present invention will be apparent from the following description, reference being had to the accompanying drawing wherein a preferred form of the present invention is clearly shown.

In the drawing:

FIGURE 1 illustrates a preferred embodiment of the present invention.

FIGURE 2 is an enlarged view of part of FIGURE 1.
FIGURE 3 is a section on line 3—3 of FIGURE 2.

The motor vehicle includes a pair of side frame members 10 and 12 having a pair of mounting plates 14 and 16 secured thereto. A pair of dirigible wheels 18 and 20, one at each side of the vehicle are connected to the side frame members 10 and 12, respectively, by the usual independent, resilient suspensions indicated schematically at 22 and 24. Knuckle arms 26 and 28 are provided on each of the wheels 18 and 20, to which are connected steering linkage including the usual tie rods indicated schematically at 30 and 32.

The power strut assembly includes a cylinder member 34 which extends transversely across the vehicle and is fixedly mounted at its opposite ends in the side plate members 14 and 16. The mountings, indicated at 36 and 38, are such as to restrain the cylinder 34 against both longitudinal and rotational movement relative to the vehicle frame. The mounting 36 includes a collar 40 which is secured as by welding to the cylinder and to the side plate 14. The mounting 38 includes a combination gear housing and valve body 42 which encircles cylinder 34 and may be welded thereto. Housing 42 is secured to the side plate 16 by a plurality of bolts 44, only one of which is shown.

A hollow piston rod 46 carries at its left hand end a piston 48 which forms with the cylinder end plug 50 a working chamber 52. At its opposite end, rod 46 has connected thereto, by a pin 54, a plunger member 56 which carries intermediate its ends a gear rack, not shown, and at its outer end a piston member 58. The piston member 58 forms with the end plug a working chamber 62.

The gear housing and valve body 42 carries an input shaft 64 which is connected to the steering wheel 66 of the motor vehicle through a flexible connector indicated at 68. An input signal from the steering wheel 66 is transmitted through gearing, not shown, to the rack carried by the plunger 56 and thus to the piston rod 46. A conventional lost motion connection between the input shaft 64 and the plunger 56 is effective to shift the usual open-center control valve inside the gear housing and valve body 42, to vary the degree of communication between an input fluid port 70 and a return port 72, and a pair of motor ports 74 and 76. The motor ports 74 and 76 are connected respectively to the working chambers 52 and 62. Pressure differentials created by the operation of the control valve will result in forces on the coupled pistons 48 and 58 tending to shift them and the rod 46 longitudinally of the cylinder 34.

A generally tubular output member 78 surrounds the cylinder 34 and is supported thereon for longitudinal sliding motion relative thereto. The output member 78 includes a pair of mounting ears 80 and 82, in which are fixed a pair of studs 84 and 86 for connection to the inner ends of the schematically indicated tie rods 30 and 32. It should be noted that the ears 80 and 82 are radially offset from the axis of the cylinder 34 and that thrust longitudinally of the tie rods 30 and 32 results in a turning moment on the output member 78, tending to rotate it about the axis of cylinder 34.

Output member 78 is coupled to the piston rod 46 by a coupling pin 88 which extends transversely through the cylinder 34 and the rod 46 to engage the output member 78 at diametrically opposed points on opposite sides of the cylinder. The pin 88 snugly engages the rod 46 so as to effectively transmit force from the pistons 48 and 58 to the output member 78. Pin 88 is shiftable longitudinally of cylinder 34 in elongated, longitudinally extending slots 90 and 92, through which the pin 88 extends to engage the output member 78. The elongated slots 90 and 92 are so proportioned that their chordal width is the same as the diameter of pin 88, thus the output member 78 is restrained against rotation by the engagement between the pin 88 and the sides of the slots 90 and 92, it being recalled that the cylinder 34 is fixedly mounted to the vehicle frame. The pin 88 thus performs the dual function of transmitting thrust from the piston and rod assembly to the output member 78, and also restraining the output member 78 against rotation induced by thrust from the tie rods. Piston members 48 and 58 are longitudinally located so as to be interposed between the working chambers 52 and 62, respectively, and the openings 90 and 92 throughout the full range of travel of the power strut.

It will thus be seen that there has been provided an improved power strut for use in motor vehicle power steering which permits an eccentric coupling to the steering linkage, while it at the same time restrains the members against the rotation induced by such a connection.

While the form a embodiment of the invention as herein disclosed constitutes a preferred form, it is to be understood that other forms might be adopted, all coming within the scope of the claim which follows.

What is claimed is as follows:

In a power steering mechanism for an automotive vehicle having a frame and a pair of steerable road wheels, a cylinder nonrotatably affixed to said frame and having its longitudinal axis extending substantially transversely to the longitudinal axis of the automotive vehicle, a piston positioned for reciprocation within said cylinder, a tubular output member positioned concentrically around said cylinder, said tubular output member being supported for longitudinal sliding movement upon said cylinder, said tubular output member having a pair of ears radially offset from the longitudinal axis of said piston, cylinder and output member, means connecting said ears with the steerable road wheels for transmission of power from said output member to the steerable road wheels, said cylinder having a pair of diametrically opposed slots positioned therein, a pin affixed to said piston and to said output member and extending through said slots for transferring power from said piston to said tubular output member, the chordal width of said slots being substantially equal to the diameter of said pin to prevent rotation of said output member relative to said cylinder.

References Cited in the file of this patent

UNITED STATES PATENTS

| | | |
|---|---|---|
| 1,429,101 | Ross | Sept. 12, 1922 |
| 1,804,446 | Stokes | May 12, 1931 |
| 2,020,041 | Rockcastle et al. | Nov. 5, 1935 |
| 2,030,441 | Ganz | Feb. 11, 1936 |
| 2,867,284 | Hruska | Jan. 6, 1959 |
| 2,884,258 | Brueder | Apr. 28, 1959 |